United States Patent [19]

Stockton

[11] 4,288,927
[45] Sep. 15, 1981

[54] TERRESTRIAL MAGNETISM RESPONSIVE METHOD AND DEVICE INCLUDING A SOFT IRON BAR ON A FREE END OF A MAGNET

[76] Inventor: Raymond F. Stockton, 1780 Foothill Dr., Vista, Calif. 92083

[21] Appl. No.: 68,119

[22] Filed: Aug. 20, 1979

Related U.S. Application Data

[63] Continuation-in-part of Ser. No. 829,265, Aug. 31, 1977, Pat. No. 4,217,699.

[51] Int. Cl.³ .................... G01C 17/08; G01V 3/08
[52] U.S. Cl. ........................ 33/355 R; 33/352; 324/345
[58] Field of Search ............. 33/355 R, 355 D, 352, 33/364; 324/8, 259

[56] References Cited

U.S. PATENT DOCUMENTS

| | | | |
|---|---|---|---|
| 1,746,627 | 2/1930 | Babbitt | 324/259 X |
| 2,493,779 | 1/1950 | Rubenstein | 324/259 |
| 3,423,672 | 1/1969 | Stockton | 324/8 |
| 4,156,178 | 5/1979 | Stockton | 33/364 X |
| 4,217,699 | 8/1980 | Stockton | 33/355 R |

*Primary Examiner*—William D. Martin, Jr.
*Attorney, Agent, or Firm*—Whann & McManigal

[57] ABSTRACT

A terrestrial magnetism responsive device adapted to be worked using a north or south seeking magnet in both north and south headings, the device including a housing having a north or south seeking magnet therein. The magnet is suspended adjacent one pole by a sensitive spring to permit the magnet to be movable horizontally, when released, from a north pointing position or a south pointing position. Secured and balanced on the seeking or free end of the magnet is a soft iron rod, generally at ninety degrees to the magnet and having substantially the same diameter as the magnet. The rod is balanced along with the magnet so that the magnet and rod together will move horizontally. The housing is rotatable on a plate by which it is held and during operation is fixed on the plate to be moved horizontally in the direction of an area to be explored.

The method includes the releasing of a north or south seeking magnet in the housing so that it is free to move east and west on the spring as the housing in its fixed directional position is moved over the areas to be explored. As it is moved, the east/west diversions of the magnet and the exact locations of the diversions are recorded to be used in determining the location of surface and subsurface local structures which have local magnetic force fields causing the diversions of the magnet.

12 Claims, 1 Drawing Figure

TERRESTRIAL MAGNETISM RESPONSIVE METHOD AND DEVICE INCLUDING A SOFT IRON BAR ON A FREE END OF A MAGNET

CROSS REFERENCE TO RELATED APPLICATION

This application is a continuation-in-part of my application entitled TERRESTRIAL MAGNETISM RESPONSIVE DEVICE AND METHOD FOR USING NORTH OR SOUTH SEEKING MAGNETS IN BOTH NORTH AND SOUTH HEADINGS, Ser. No. 829,265, filed Aug. 31, 1977, now U.S. Pat. No. 4,217,699.

BACKGROUND OF THE INVENTION

Many earth formations give off radiations which are peculiar to the physical properties of the formations, and considerable exploration is done with structures for measuring the radiated rays and local magnetic force fields produced by surface and subsurface formations.

With a general knowledge of influencing physical properties and with the measured magnetic variations, it is possible to predict the probable geological structure of the subsurface in a given locale.

DESCRIPTION OF THE PRIOR ART

There are numerous structures adapted to respond to localized magnetic force fields. The closest prior art known to applicant are the structures shown in his patents entitled TERRESTRIAL MAGNETISM RESPONSIVE DEVICE INCLUDING FLUID SUPPORTED INDICATING MEANS FOR INVESTIGATING SUBSURFACE CHARACTERISTICS OF THE EARTH, U.S. Pat. No. 3,423,672, issued Jan. 21, 1969 and IMPROVEMENTS IN TERRESTRIAL MAGNETISM RESPONSIVE DEVICES, U.S. Pat. No. 4,156,178, issued May 22, 1979.

As indicated in the prior art, it has been found that local magnetic force fields produced by subsurface formations can be detected by working a south seeking magnet north and a north seeking magnet south in the Northern Hemisphere, the reverse being true in the Southern Hemisphere.

A north seeking end of a magnet working south has less pulling power on it than it would have if working in a northerly direction in the Northern Hemisphere. This lesser pulling power permits the magnet to swing, or rotate, more freely from side to side, permitting a wider range of readings on a scale so as to produce more efficiency in the operation.

While prospecting with terrestrial magnetism responsive devices, one is concerned only with the movement of the magnet from right to left of a given point of a scale. When moving from the given point to the right, for example, the explorer must follow that direction because the instrument has picked up an ambient field emanating from the earth's surface, and this ambient field is what the explorer is trying to locate as it is coming from a formation in the earth that is capable of producing a stronger magnetic field than the surrounding material with which it is associated.

SUMMARY OF THE INVENTION

The improvement here is the surprising discovery of the benefits of the use of a soft iron rod on the north seeking end of a magnet. It has been surprisingly found that the application of a soft iron member secured to the free end of the magnet in a crossing relationship provides a means of using the strongest force of any magnet; that is, it comes from the end, in this case the two ends of the crossing iron bar, directly into the east and west ambient magnetic field. The use of the crossing iron rod which generally forms a "T" with the magnet increases the sensitivity and accuracy of the readings with respect to the subsurface formations as much as 100% over that in the prior art.

The magnet is held in suspension by a wire coil spring at the south end, for example, and the north seeking end, having the soft iron bar thereacross, is adapted to move, when released, from side to side through the magnetic meridians of the earth in balance with the magnetic fields thereof. The north seeking end may be worked both in the northerly and southerly direction.

In the situation where the south pole of the magnet is held by the spring and the north pole is free, a three pole structure is formed with the addition of the crossing soft iron rod or bar fixed to the north pole of the magnet. Thus, the soft iron rod becomes a part of the magnet and has north poles at both of its ends. In the magnet formed with the crossing soft iron bar, generally shown as a "T" assembly, the leg of the "T" is a permanently magnetized magnet and the soft iron bar is unmagnetized. The soft iron bar will become magnetized in the assembly and the whole piece becomes one magnet with two north poles and one south pole.

The Y-shaped magnet in my U.S. Pat. No. 3,423,672 was developed to balance the north-south meridian lines with those of the ambient fields that can be picked up from the east or west when testing at the surface of the earth. In the present invention using a soft iron rod in the crossing arrangement with the rod magnet, it has been found that the present assembly can do all that the Y-shaped magnet could do and, moreover, it has been found to be superior in its sensitivity and accuracy up to 100% in its reaction to the ambient fields being explored.

It has also been surprisingly found that the crossing or "T" assembly when held by the spring attachment and forced to work in the southwardly heading, with its two north poles heading in the east and west directions, works better than when it is used in the northwardly direction. This use in the southwardly direction is one in a south repelling magnetic field.

The south repelling magnetic field may be understood by considering the positioning of a magnet secured on its north pole and having its south pole free and working in the south direction. In this situation, the north pole of the magnet is directed to the north magnetic pole and to the north magnetic meridian forces of the earth working from the north pole to the equator. However, the south seeking end of the magnet is repelled by the north magnetic meridian lines and repels the north magnetic meridian forces. Thus, the field in which the magnet is working is a south repelling magnetic field. Hence, when the situation is reversed and the north pole of the magnet is working in a southwardly direction, it does not repel the north magnetic meridian forces of the earth working from the north pole to the equator. In addition, when the north seeking end of the magnet is working in the southerly heading, there is less pulling power on it coming from the magnetic north lines. This permits the magnet assembly to work freely and increases its attractive forces with respect to the ambient fields.

Further, when the magnet assembly is held by a spring and the housing is rotated to any direction, the magnetic assembly is forced to work that direction. This heading in any direction becomes useful when trying to pick up formations in the earth that have been magnetized at a time previous to the time when great upheavals in the earth changed the direction of the polarity and the structural formations.

Accordingly, it is an object of the present invention to provide an improved terrestrial magnetism responsive device and method in which the free end of the magnet includes the applied crossing soft iron bar at the end of the magnet.

It is another object of the invention to provide a device and method, as described in the preceding paragraph, which is particularly useful in detecting formations of the earth that had been magnetized at a time previous to the time when great upheavals in the earth changed the direction of the polarity of the formational structures.

It is a still further object of the invention to provide a device and method, as described in the preceding paragraphs, in which a soft iron bar fixed at the free end of the magnet improves the sensitivity and accuracy of the magnet in detecting ambient local magnetic forces with a sensitivity and accuracy improvement of up to 100% over the prior art.

It is a further object of the invention to provide a device in which the support member for the resiliently held magnet, with the crossing soft iron bar on its end, includes a means in which to rotate and fix the support member for working the free end of the magnet in any selected direction.

Further objects and advantages of the invention may be brought out in the following part of the specification, wherein small details have been described for the completeness of disclosure, without intending to limit the scope of the invention which is set forth in the appended claims.

BRIEF DESCRIPTION OF THE DRAWINGS

Referring to the accompanying drawings, which are for illustrative purposes.

DESCRIPTION OF THE PREFERRED EMBODIMENT

Figure 1:
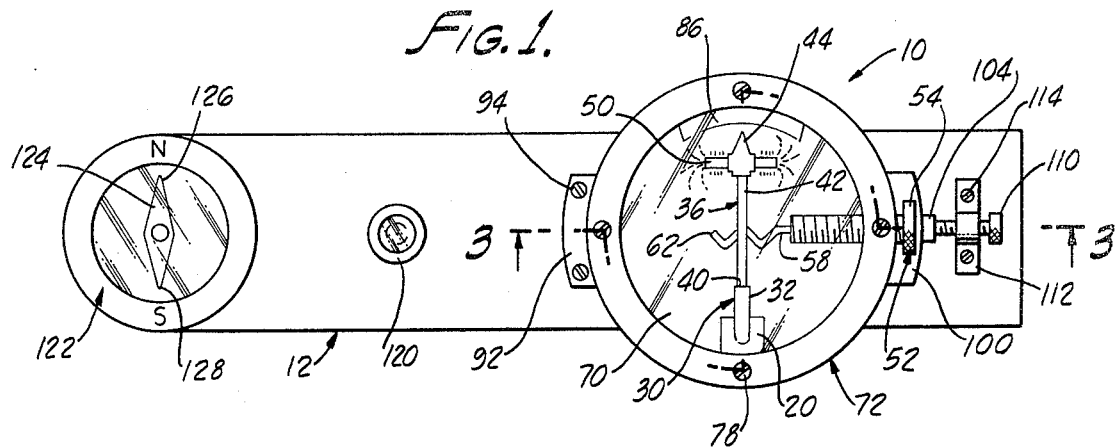
FIG. 1 is a plan view of the invention, illustrating the north seeking magnet pointing in the northerly direction.

Referring again to the drawings, there is a generally cylindrical housing 10 fixed to and adapted to be rotated on an elongated supporting plate 12. The bottom of the housing is formed by a disc 14, FIG. 3, and extending upwardly therefrom is a cylindrical wall 16. The wall 16 is secured to the disc 14 by means of screws 18. In abutment with a portion of the inner surface of the wall 16 is a spring supporting member 20 secured to the disc 14 by means of a screw 22. The top end of the member 20 has a bore from which extends a pin 24, having its upper end outwardly of the member 20. The pin 24 is secured in the supporting member by a screw 26. Secured to the upper end of the pin 24 is the lower end 28 of a sensitive coil spring 30 and secured to the other end 32 of the spring is a magnetic rod or bar 36 having its south pole 40 in the spring and its north seeking end 42 having a pointer 44 fixed thereon, and adapted to point in a northerly direction, FIG. 1, when uninfluenced by magnetic forces except those along the north magnetic line.

The pointer 44 has a bore at right angles to the magnet and in the bore extends an unmagnetized soft iron rod or bar 50. The bar has its center at the end of the magnet 36. The bar 50 is of the same diameter as the magnet 36 and is shown to be perpendicular thereto. As the magnetic lines of force indicate, the bar 50 is magnetized and receives magnetic force from the magnet. Lines of force extend outwardly from the soft iron bar in all directions and set up a double-headed north seeking magnet, FIG. 1, with a wide north seeking field. If no other magnetic forces act upon it, the pointer will settle on the north magnetic line.

The spring 30 effects a right angle so as to hold the magnet and bar, when they are otherwise non-supported, in a horizontal position free to be moved by magnetic forces. All other parts of the housing and the plate 12 are non-magnetic.

Figure 2:
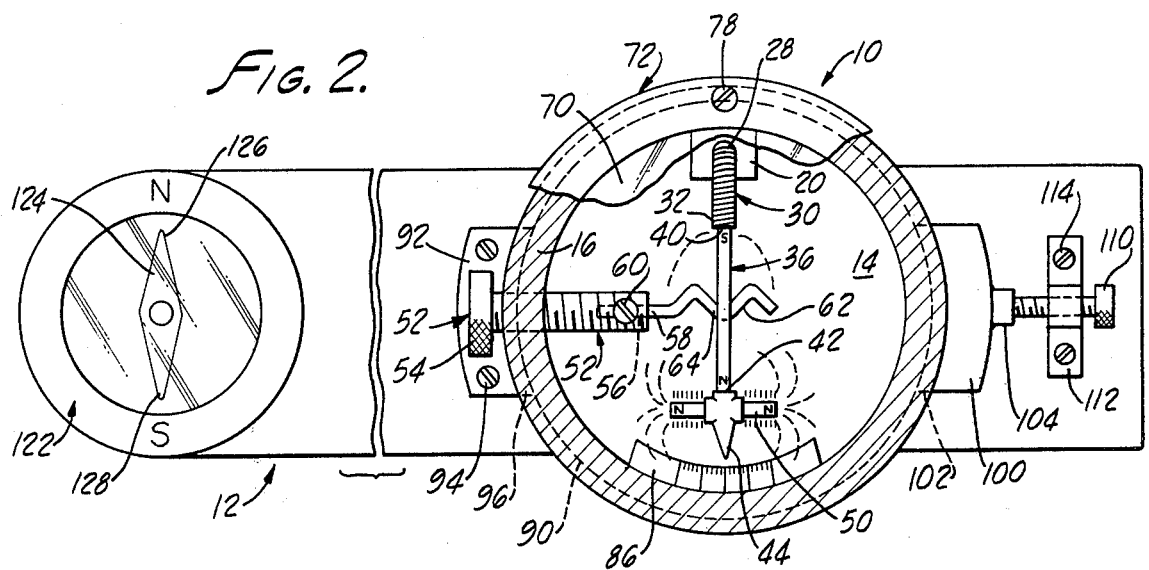
FIG. 2 is a broken plan view of the invention, illustrated in FIG. 1, in which the north seeking magnet has been rotated in its housing to point in a southerly direction.

A device generally designated as 52 for holding the bar magnet 36 in a transporting position is shown. It is comprised of a screw 54 threadedly engaged in the wall 16 and having a bore 56 on its inner end, the bore receiving a wire 58, the wire being secured in the bore by a screw 60. In FIGS. 1 and 2, the wire is in plan view extending horizontally, and disengaged from the magnet 36, the wire having the shape of an "M" 62. Then when the screw 52 is rotated ninety degrees so as to raise the "M" to a vertical position as shown in phantom outline in FIG. 3, its nadir 64 will engage the magnet and hold it in position for transporting.

Figure 3:
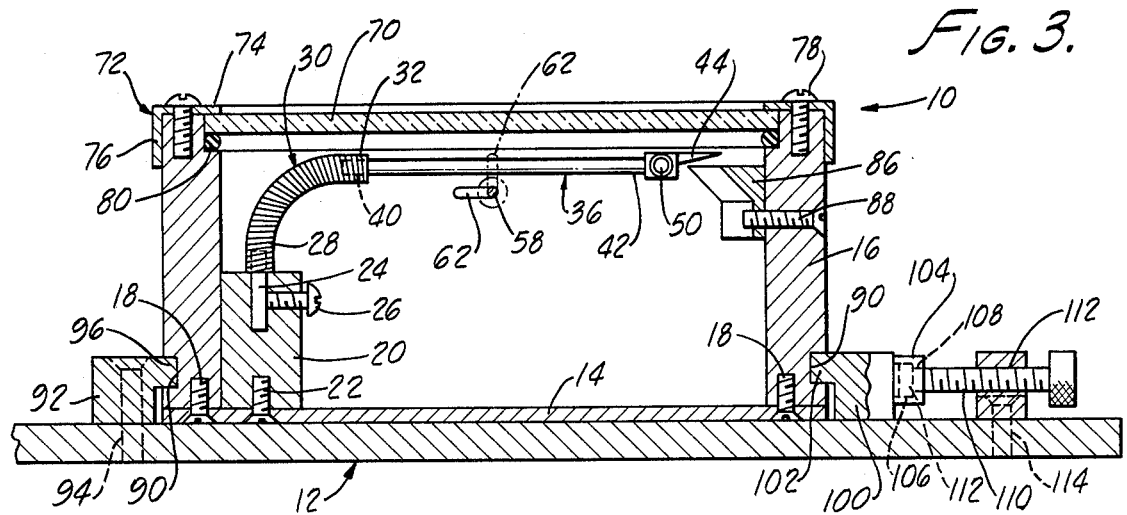
FIG. 3 is a fragmentary cross-sectional view of the invention taken along the line 3—3 in FIG. 1.

Directly above the magnet is a glass plate 70, FIG. 3, fitted in a ring-shaped flange 72, the inner circumference of the ring fitting over the glass at 74 and the ring having a vertical wall 76 fitting over the cylindrical wall 16. The ring is held in place by a series of screws 78. The glass plate extends into an enlarged internal diameter of the wall 16 and directly below on a shoulder is a sealing ring 80, the flange 72 securing the glass on the ring to seal the inside of the housing. Cork insulating means may be used to control the temperature within the housing by securing it inside or outside thereof as desired.

A scale 86 is within the housing directly below the pointer when it is pointing toward magnetic north as shown in FIG. 1. The scale is secured to the housing wall 16 by a screw 88.

Adjacent the plate 12 is a horizontal annular groove 90 cut into the external surface of the cylindrical wall 16, FIGS. 2 and 3. On the left side of the plate is a fixed shoe 92 arcuate in plan view, secured to the plate by screws 94. The shoe has an inwardly directed flange 96 which extends into groove 90 and in which it is engaged for relative rotation. On the right side of the housing is a slideable shoe 100 having an inwardly directed horizontal arcuate flange 102 fitted in the annular groove 90. Extending from the shoe 100 is a cup 104 having an inner enlarged diameter 106 and a smaller opening diameter 108 in which an unthreaded portion of a screw 110 fits. At the end of the screw 110 is a head 112 adapted to hold the end of the screw in the cup and attached to the shoe. Screw 110 is threadedly engaged in a bar 112, the bar being secured to the plate 12 by screws 114. Thus, when the screw 110 is rotated to move the shoe 100 away from the housing 10, the flange 102 is either loosened in the groove 90 or may be removed entirely therefrom. When it is loosened, the housing may be rotated to any position with respect to the plate and with respect to the north, south, east and west directions. When the flange 102 is completely removed from the groove, the housing may be removed from the plate. The groove and flange relationship is provided to prevent the housing from slipping off of the plate when the screw 110 is loosened.

As shown in FIG. 1, to the left of the housing is a leveling bubble 120 secured in the plate 12. When the bubble is centered, the plate and housing 10 are in a horizontal position.

As shown in FIGS. 1 and 2, attached to the upper face of the plate 12 is a compass 122, spaced sufficiently away from the magnet 36 so as to not be influenced by it. The compass has a needle 124 having a north seeking end 126 and a south pole 128. The pole 126 is adapted to point to magnetic north at all times.

Using the magnet 36 where it is suspected that there might be formations having physical properties which will set up local magnetic force fields, the device is held in an exactly horizontal position as indicated by centering the bubble in the device 120.

In FIG. 1, the device is held by the shoes 92 and 100 so that the magnet is directed to magnetic north when it is uninfluenced by ambient magnetic fields. When searching for ambient fields, the holding device 62 is positioned as shown so as to free the magnet 36 so that it can be diverted by such fields. Typically, this is accomplished by rotating the housing in the shoes so that the magnet will not be directed toward magnetic north.

The general effect of working the magnet where it is released from a position in which it is not directed to magnetic north is to decrease the influence of the magnetic north field power, and this decrease tends to balance the forces in the ambient fields being explored with the magnetic forces of the north magnetic meridian. Then when the magnet is released by rotating the screw 54, the magnet will move to the left or right under the influence of the ambient forces being explored and they will cause the pointer to record the movement for measurement on the scale 86. When the pointer is moved from the position where it is fixed off magnetic north, the diversions are noted and the exact location where the test is being made is also noted. This information is turned over to engineers for analysis and for determination of whether exploratory operations should be performed at this particular location.

The operation moving in the southerly direction is the same as that in the northerly direction, except that when the north seeking end of the magnet is worked southerly, it has less pulling power on it than it has when working in the north direction. This permits the magnet to swing or rotate more freely from side to side to provide a wider range of readings on the scale, and thereby produces more efficiency in regard to finding the local magnetic force fields.

When prospecting, the operator is interested in the movement of the pointer from left to right of a given point on the scale. When moving from that point to the right, for example, that direction indicated must be followed because the instrument has picked up an ambient field emanating from the earth's surface and one which is being attempted to be located, the field coming from a formation being capable of producing a stronger magnetic field than the surrounding material with which it is associated.

In the crossing assembly of the magnet 36 and the soft iron bar 50, the latter becomes magnetized and the whole piece becomes one magnet with two north poles and one south pole. That is, the north pole of the magnet is shifted to the two ends of the crossing bar 50, each end of the bar being a north pole. The Y-shaped magnet in my U.S. Pat. No. 3,423,672 was developed to balance the north-south magnetic meridian lines with those of the ambient fields that can be picked up from the east or west when testing at the surface of the earth. It has been surprisingly found that the crossing bar or "T" assembly formed by the magnet 36 and the bar 50 does all that the Y-shaped magnet could do and, in addition, it is superior up to 100% in its sensitivity and accuracy.

The "T" assembly, when held by the spring attachment and forced to work in the south heading as shown in FIG. 2 with the two north poles heading in the east and west directions, works better than when it is headed into the north direction. As indicated above, the example as shown in FIG. 2 is for working in a south repelling magnetic field.

Further, when the magnet assembly in the housing is held by the spring and the housing is rotated in any direction on the plate 12 and the shoes, the magnetic assembly is forced to work in that direction. This heading in any direction becomes useful when trying to pick up the formations in the earth that have been magnetized at a time previous to the time when the great upheavals in the earth changed the direction of the polarity of the formations.

In addition, one reason the "T" formation provided in this invention is more sensitive than the "Y" formation as disclosed in the above patent, is that using the two north seeking poles directly into the east and west ambient fields, creates more attractive force from the magnetic assembly.

The balancing of the forces along the north magnetic meridian in the present invention results in permitting the magnetic fields of the soft iron bar to move in a direction left or right when under the influence of the ambient forces so that the pointer indicates their direction in the formations.

In this invention, the pointer need not be offset from the true north or the true south when it is worked in the respective northerly or southerly directions.

The invention and its attendant advantages will be understood from the foregoing description, and it will be apparent that various changes may be made in the form, construction and arrangement of the parts of the invention without departing from the spirit and scope thereof, or sacrificing the material advantages, the arrangement hereinbefore described being merely by way of example. I do not wish to be restricted to the specific form shown or uses mentioned, except as defined by the accompanying claims, wherein various portions have been separated for clarity of reading and not for emphasis.

I claim:

1. In a terrestrial magnetism responsive device adapted for working a northwardly or southwardly seeking magnet in any heading, comprising:
   (a) a support member,
   (b) a sensitive resilient member having one end secured to said support member, (c) a pole seeking magnet having a free end for working in a selected heading, (d) a non-seeking pole of the magnet secured adjacent the last pole to said resilient member adjacent its other end, (e) said magnet extending substantially horizontally from said resilient member and being movable horizontally on said resilient member, and (f) a soft iron member attached adjacent the free end of the magnet and being balanced thereon to allow the magnet to be moved substantially horizontally.

2. The invention according to claim 1, including:

means in which to rotate and fix said support member for working said free end of said magnet in a selected direction.

3. The invention according to claim 2, in which:

said last means is a housing carrying said support member, said housing being mounted on a plate and being rotatable thereon, means to fix said housing on said plate in a selected rotated position.

4. The invention according to claim 3, in which:

the free end of the magnet is northwardly seeking and the non-seeking end of the magnet is the south pole.

5. The invention according to claim 1, in which:

said soft iron member is a bar attached at its center to said magnet.

6. The invention according to claim 4, in which:

said soft iron member is a bar attached to said magnet, said magnet is a rod having a pointer on its free end outwardly of said soft iron bar, and a scale in said housing to measure movements of said pointer.

7. The invention according to claim 6, in which:

said soft iron bar is perpendicular to said rod, said bar and rod having the same diameter.

8. A method of locating surface or subsurface formations that generate local magnetic force fields, comprising:

securing the south pole of a magnet to one end of a resilient support to hold the magnet in a horizontal position and so that the north seeking end of the magnet is free to be acted on by local magnetic force fields, securing the other end of the resilient support to a rotatable member, fitting said rotatable member on a holding plate on which it may be rotated and fixed against rotation, fixing a pointer on the seeking end of the magnet to be directed to a point on a fixed scale on said rotatable member when the magnet is directed to magnetic north or to another selected position, fixing a soft iron member to said seeking end of the magnet adjacent the pointer, balancing said soft iron member on said magnet so that the magnet remains substantially horizontal, said soft iron member being in a crossing relationship with said magnet, fixing said rotatable member on said plate so that the scale is directed in the heading that the magnet is to explore, moving said plate horizontally over a surface or subsurface area to be explored, noting diversions of the pointer on the fixed scale when said magnet is directed by local ambient magnetic fields in the surface or subsurface formations acting on the magnet and soft iron member as they are detected, and recording the locations of said diversions.

9. The invention according to claim 8, in which:

said magnet is a rod, and said soft iron member is a bar.

10. The invention according to claim 8, in which:

said magnet is a rod, and said soft iron member is a rod having the same diameter as the magnet and is perpendicular to the magnet.

11. The invention according to claim 8, in which:

said rotatable member is fixed on the plate so that the scale is directed to the south so that the magnet may be worked in a south repelling magnetic field.

12. The invention according to claim 8, including:

fixing a compass to the plate and spaced sufficiently from the magnet so as not to be influenced thereby, and using the compass to indicate magnetic north to aid in directing the magnet in the heading to be explored.

* * * * *